Dec. 19, 1933.                H. R. GIBBONS                1,940,124
                    CAGE FOR ANTIFRICTION BEARINGS
                         Filed Oct. 3, 1930

INVENTOR
HAROLD R. GIBBONS,
BY
HIS ATTORNEY.

Patented Dec. 19, 1933

1,940,124

UNITED STATES PATENT OFFICE 1,940,124

CAGE FOR ANTIFRICTION BEARINGS

Harold R. Gibbons, Chatham, N. J., assignor to General Motors Corporation, Detroit, Mich., a corporation of Delaware Application October 3, 1930. Serial No. 486,142

10 Claims. (Cl. 308—217)

This invention relates to cages for antifriction bearings and comprises all the features of novelty herein disclosed. An object of the invention is to provide an improved cage for the rolling elements of a bearing. Another object is to provide a practicable, reliable and inexpensive cage which can be produced by simple forming and assembly operations and yet be light, strong and efficient.

To these ends and to improve generally and in detail upon devices of this character, the invention also consists in the various matters hereinafter described and claimed. In its broader aspects, the invention is not necessarily limited to the specific construction selected for illustrative purposes in the accompanying drawing in which Fig. 1 is a side view, partly in section on line 1—1 of Fig. 2, of an antifriction bearing having the improved cage.

Figure 2:
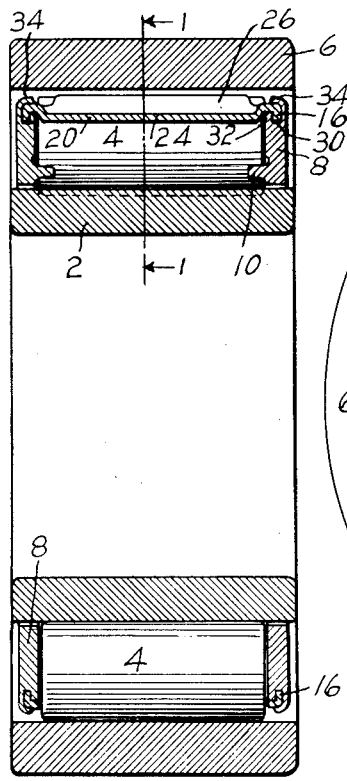
Fig. 2 is a sectional view on line 2—2 of Fig. 1.
Figure 1:
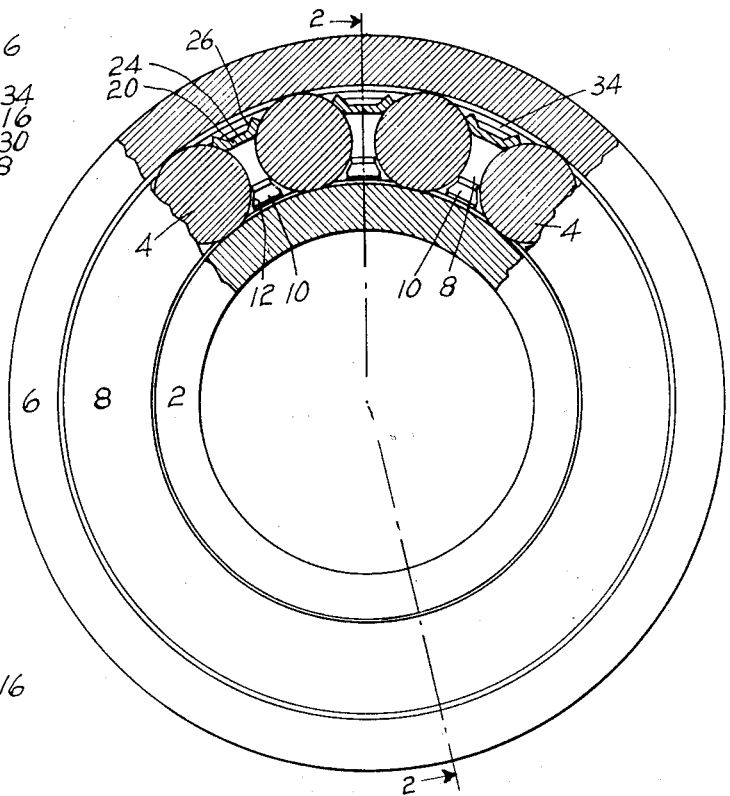
Figures 5, 6:
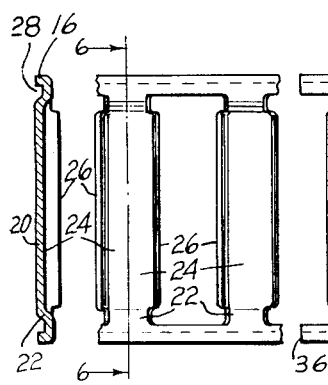
Fig. 5 is a plan view of a portion of the shell after a forming operation.
Fig. 6 is a sectional view on line 6—6 of Fig. 5.

The numeral 2 indicates an inner race ring for a circular series of rolling elements 4 which also run in an outer race ring 6. In the selected disclosure, the rollers are solid cylinders with rounded edges and the raceway surfaces are straight cylinders. To hold the rollers, two opposed end rings 8 are connected by a shell or casing, each end ring having lugs 10 projecting a little way between each pair of adjacent rollers. The edges of the lugs have roller retaining surfaces 12 which normally have running clearance with the rollers but such edges are so spaced that they prevent the rollers dropping out of the cage when the inner race ring is not in place. The ends of the rollers 4 are flat and are opposed by the adjacent flat guide faces of the end rings.

The connecting shell for the end rings 8 is preferably formed from one or more flat strips of sheet metal which have the edges turned at right angles to form flanges 16. Each strip is punched to form openings 18 leaving a series of cross bars 20 connected to the sides by neckeddown portions 22. The middle portions of the cross bars 20, from end to end, are pressed out of the original plane of the strip to form the channels 24, and the free sides of the cross bars are pressed in the opposite direction from said plane to form guide wings 26 whose inner surfaces substantially conform to the rollers. The bending of the cross bars makes them into stiff braces or connectors. The necked-down portions 22 are also partly dished so that they form a groove 28 with the adjacent flange 16.

Figures 3, 4:
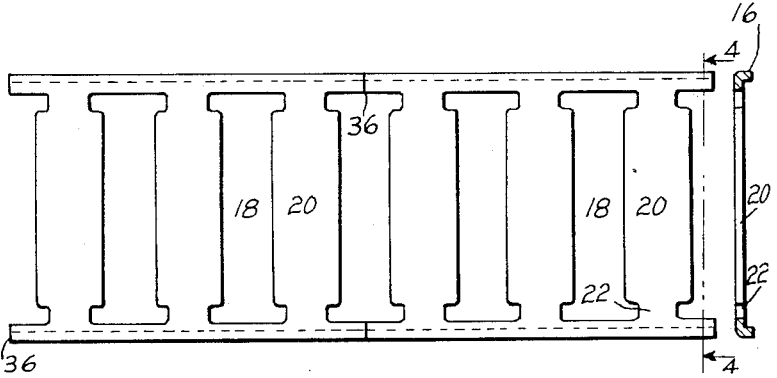
Fig. 3 is a plan view of a portion of the blank for the shell after a preliminary operation.
Fig. 4 is a sectional view on line 4—4 of Fig. 3.

The formed strip is bent into a circle or it may be composed of separate arcuate sections which together make up a circle, the flanges 16 entering grooves 30 in the end rings 8. Thus the sides of the shell surround portions of the outer edges of the end rings. Each groove is formed by a short flange 32 spaced from a longer flange 34 which is bent over onto the adjacent side of the shell thus locking the shell and flange rigidly together. With this construction, the shell needs no welding of its ends, or of the ends of its arcuate sections if made in sections, as may be desirable for large size bearings to avoid necessity of handling a long strip in the flat which might tend to distort in the stamping operation. The rollers are put in position between the ends rings 8 before the shell or its sections are attached. If the shell is made in one circular piece, a slight springing open of the piece allows the shell to slip axially over the flanges 34 and 32 prior to entry of the flanges 16 in the grooves 30. Arcuate shell sections can be easily put on the end rings by a radial assembly movement before the flanges 34 are spun over. The flanges 34 are continuous and grip the shell all around its peripheral edges so that no welded joint or joints are needed at the ends of the shell or its sections. The short flanges 32 act as stops to limit the approach of the shell sections to the bearing axis. The end of each strip or section would desirably be located between the cross bars as indicated at 36 on Fig. 3 but this location is not essential.

I claim:

1. A cage for rolling elements comprising a pair of spaced end rings, a circular series of rolling elements between the end rings, and a shell connecting the end rings, the shell having each side surrounding a portion of the outer edge of one end ring, another portion of the outer edge of the end ring surrounding and engaging the adjacent side of the shell to hold it inwardly against said first mentioned portion; substantially as described.

2. A cage for rolling elements comprising a pair of spaced end rings, a circular series of rolling elements between the end rings, and a shell connecting the end rings, the shell having inwardly projecting side flanges each entering a groove in the outer periphery of one of the end rings, and each end ring having a flange surrounding and engaging the adjacent flanged portion of the shell; substantially as described.

3. A cage for rolling elements comprising a pair of spaced end rings, a circular series of rolling elements between the end rings, and a shell connecting the end rings, the shell having each side entering a groove in one of the end rings, each end ring having a flange surrounding the adjacent side of the shell, the shell having openings between cross bars, and the cross bars being pressed inwardly between the end rings; substantially as described.

4. A cage for rolling elements comprising a pair of spaced end rings, a circular series of rolling elements between the end rings, and a shell connecting the end rings, the shell having openings between cross bars, the cross bars having their middle portions pressed inwardly from the shell between the end rings, and the side edges of the cross bars being pressed outwardly from the shell; substantially as described.

5. A cage for rolling elements comprising a pair of spaced end rings, a circular series of rolling elements between the end rings, the rolling elements having their ends guided between guide faces on the end rings, lugs projecting from the inner portions of the end rings between adjacent rolling elements, a shell connecting the end rings and having its sides surrounding portions of the outer peripheries of the end rings, and the end rings having flanges projecting towards one another and surrounding the sides of the shell; substantially as described.

6. A cage for rolling elements comprising a pair of spaced end rings, a circular series of rolling elements between the end rings, the rolling elements having flat ends opposing flat guide faces on the end rings, a shell connecting the end rings, the end rings having flanges surrounding the sides of the shell, the shell having openings between cross bars, and the cross bars being pressed inwardly between the guide faces of the end rings; substantially as described.

7. A cage for rolling elements comprising a pair of spaced end rings, a circular series of rolling elements between the end rings, a shell connecting the end rings and having its sides surrounding portions of the outer edges of the end rings, the shell being composed of arcuate abutting sections, the end rings having peripheral flanges surrounding the side edges of said arcuate sections, lugs projecting from the inner edges of the end rings between adjacent rolling elements, and the shell having openings between cross bars with the middle portions of the cross bars pressed inwardly between the end rings; substantially as described.

8. A cage for rolling elements comprising a pair of spaced end rings having grooves in the outer periphery, a series of rolling elements between the end rings, a circular shell connecting the end rings and having inwardly directed flanges entering the grooves of the end rings, and one wall of the groove in each end ring being longer than the other wall and turned laterally over the outside of the shell to hold the shell flange in the groove; substantially as described.

9. A cage for rolling elements comprising a pair of spaced end rings, a series of rolling elements between the end rings, a shell connecting the end rings and being composed of arcuate sections, the end rings having grooves in the outer periphery and the arcuate sections having side flanges entering the grooves, and the end rings having flanges extending towards one another and surrounding the flanged portions of the shell sections; substantially as described.

10. A cage for rolling elements comprising a pair of spaced end rings, a series of rolling elements guided between the end rings, a shell connecting the end rings and having its sides surrounding portions of the outer peripheral edges of the end rings, and means carried by the end rings for holding said shell sides inwardly against said peripheral edges; substantially as described.

HAROLD R. GIBBONS.